(12) United States Patent
Subramaniam et al.

(10) Patent No.: US 12,289,066 B2
(45) Date of Patent: Apr. 29, 2025

(54) MOTOR INDUCTANCE CALIBRATION SYSTEM AND METHOD

(71) Applicant: Lennox Industries Inc., Richardson, TX (US)

(72) Inventors: Palanivel Subramaniam, Richardson, TX (US); Yan Yang, Wylie, TX (US); Kishor Satish Gaikwad, Dallas, TX (US); Sunil K. Khiani, Plano, TX (US); Stephen J. Vendt, Carrollton, TX (US); Nasim Arbab Rahman, Allen, TX (US)

(73) Assignee: Lennox Industries Inc., Richardson, TX (US)

( * ) Notice: Subject to any disclaimer, the term of this patent is extended or adjusted under 35 U.S.C. 154(b) by 120 days.

(21) Appl. No.: 18/346,900

(22) Filed: Jul. 5, 2023

(65) Prior Publication Data
US 2025/0015738 A1 Jan. 9, 2025

(51) Int. Cl.
| | |
|---|---|
| *H02P 21/00* | (2016.01) |
| *H02P 21/18* | (2016.01) |
| *H02P 21/22* | (2016.01) |
| *H02P 27/08* | (2006.01) |

(52) U.S. Cl.
CPC .......... *H02P 21/0017* (2013.01); *H02P 21/18* (2016.02); *H02P 21/22* (2016.02); *H02P 27/08* (2013.01)

(58) Field of Classification Search
CPC ....... H02P 21/0017; H02P 21/18; H02P 21/22
USPC ....................................................... 318/400.2
See application file for complete search history.

(56) References Cited

U.S. PATENT DOCUMENTS

| | | | | |
|---|---|---|---|---|
| 6,025,692 | A * | 2/2000 | Yamada | H02P 6/28 318/722 |
| 6,040,560 | A * | 3/2000 | Fleischhauer | A24F 40/53 219/494 |
| 2009/0237013 | A1* | 9/2009 | Sato | B60L 15/08 318/400.15 |
| 2015/0048774 | A1* | 2/2015 | Lijima | H02P 21/0025 318/801 |

* cited by examiner

*Primary Examiner* — Erick D Glass
(74) *Attorney, Agent, or Firm* — Baker Botts L.L.P.

(57) ABSTRACT

A system for calibrating inductance at a motor comprises the motor, a motor drive circuit, and a processor operably coupled to the motor. The processor determines inductance map data that comprises a set of inductance values associated with a set of current values. The processor determines that the motor is in operation. In response, the processor determines current values with which the motor is being operated. The processor determines inductance values associated with the determined current values. The processor determines reference current values at the motor based on the determined inductance values. The processor also determines a speed, angle, flux, and torque associated with the motor based at least on the determined inductance values. The processor then controls the operation of the motor based on the determined reference currents, the speed, and the torque.

20 Claims, 4 Drawing Sheets

MOTOR INDUCTANCE CALIBRATION SYSTEM AND METHOD

TECHNICAL FIELD

The present disclosure relates generally to heating, ventilation, and air conditioning (HVAC) systems and methods of their use, and more specifically to motor inductance calibration system and method.

BACKGROUND

Heating, ventilation, and air conditioning (HVAC) systems are used to regulate environmental conditions within an enclosed space. Typically, HVAC systems include an evaporator coil and a condenser coil. A blower of the HVAC system pulls warm air from the enclosed space and pushes the air across the evaporator coil to cool the air. The air is cooled via heat transfer with refrigerant flowing through the evaporator coil and returned to the enclosed space as conditioned air. Meanwhile, the refrigerant flowing through the evaporator is heated and generally transitions to the vapor phase. After being pressurized by a compressor, the refrigerant from the evaporator coil flows toward the condenser coil where it is cooled before flowing back to the evaporator coil to repeat the cycle. These components of the HVAC system are run by motors. Motors are modeled based on motor parameters, including inductance. As a motor operates, the inductance value of the motor varies as a function of the current fed to the motor.

SUMMARY

The system described in the present application provides several practical applications and technical advantages that overcome the current technical problems described herein. The following disclosure is particularly integrated into a practical application of inductance calibration at interior permanent magnet synchronous motors (PMSMs). An interior PMSM is a type of motor where a rotor is located inside a stator of the motor. The PMSMs are operated based on motor parameters, including inductance values along the direct axis (d-axis) and inductance values along the quadrature axis (q-axis). The inductance values along the d-axis are referred to as Ld. The inductance values along the q-axis are known as Lq. The d-axis refers to a component of a stator magnetic field that is in phase with the rotor magnetic field. The q-axis refers to a component of the stator magnetic field that is 90° out of phase with the rotor magnetic field. The d-axis is aligned with the rotor's magnetic field, while the q-axis is perpendicular to the d-axis. The PMSMs are sensitive to Ld and Lq—meaning with slight changes in Ld and Lq, the operation of the PMSMs will also change.

In current approaches, the Ld and Lq are taken as constants. However, these approaches are not accurate because the Ld and Lq values vary as functions of current values applied to the motor along the d-axis (Id) and current values applied to the motor along the q-axis (Iq). Thus, the current approaches lead to inaccurate Ld and Lq and, in turn, other inaccurate motor parameters that are derived from the Ld and Lq, including reference currents values (e.g., reference Id and Iq), speed of the rotor, and torque of the motor. Furthermore, the inaccurate Ld and Lq lead to inaccurate current control for the motor. Therefore, the efficiency of the motor is reduced due to inaccurate Ld and Lq, and inaccurate current control.

The disclosed system contemplates a method to calibrate the inductance model of the motor for every current and every operation of the motor. The disclosed system is configured to update the inductance values Ld and Lq of the motor based on the operating current that is applied to the motor. Therefore, a more accurate inductance value is used for determining other motor parameters, such as the reference Id and Iq, speed, and torque, among other parameters.

With inaccurate motor parameters, power resources (e.g., voltage or power signals) prescribed for the motor may be overestimated. The disclosed system is further configured to provide an additional practical application of conserving power resources that would otherwise be provided to the motor due to overestimated power/voltage needs. Furthermore, the disclosed system may provide an additional practical application for improving the current control and the motor control by determining more accurate and calibrated inductance values. This, in turn, leads to improving the overall operation of the motor.

In certain embodiments, a system for calibrating inductance at a motor comprises a motor, a motor drive circuit, and a processor operably coupled with the motor. The motor is configured to operate a motor-driven component. The motor drive circuit is configured to power the motor. The processor is configured to determine inductance map data that comprises a plurality of inductance values associated with a plurality of current values, wherein each of the plurality of inductance values is measured when a respective current value from among the plurality of current values applied to the motor. The processor is further configured to determine that the motor is in operation. In response to determining that the motor is in operation, the processor is further configured to determine at least one current value with which the motor is being operated. The processor is further configured to determine at least one inductance value associated with the determined at least one current value. In certain embodiments, determining the inductance value associated with the determined current comprises searching for the at least one current value from among the plurality of current values in the inductance map data and identifying, from among the plurality of inductance values, the at least one inductance value that is associated with the at least one current value in the inductance map data. The processor is further configured to determine at least one reference current value based at least in part upon the determined at least one inductance value. The processor is further configured to determine an angle associated with the motor based at least in part upon the determined at least one inductance value. The processor is further configured to determine a speed associated with the motor based at least in part upon the determined at least one inductance value. The processor is further configured to determine a flux associated with the motor based at least in part upon the determined at least one inductance value. The processor is further configured to determine a torque associated with the motor based at least in part upon the determined at least one inductance value. The processor is further configured to control an operation of the motor based at least in part upon the determined reference current value, the determined angle, the determined speed, the determined flux, and the determined torque.

Certain embodiments of this disclosure may include some, all, or none of these advantages. These advantages and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

DETAILED DESCRIPTION

As described above, previous technologies fail to provide an efficient, secure, and reliable solution for calibrating the inductance of a motor, for example, a motor used in Heating, Ventilation, and Air Conditioning (HVAC) systems). Embodiments of the present disclosure and its advantages may be understood by referring to FIGS. 1 through 4. FIGS. 1 through 4 are used to describe systems and methods for calibrating the inductance of motors used in the HVAC systems.

System Overview

Figure 1:
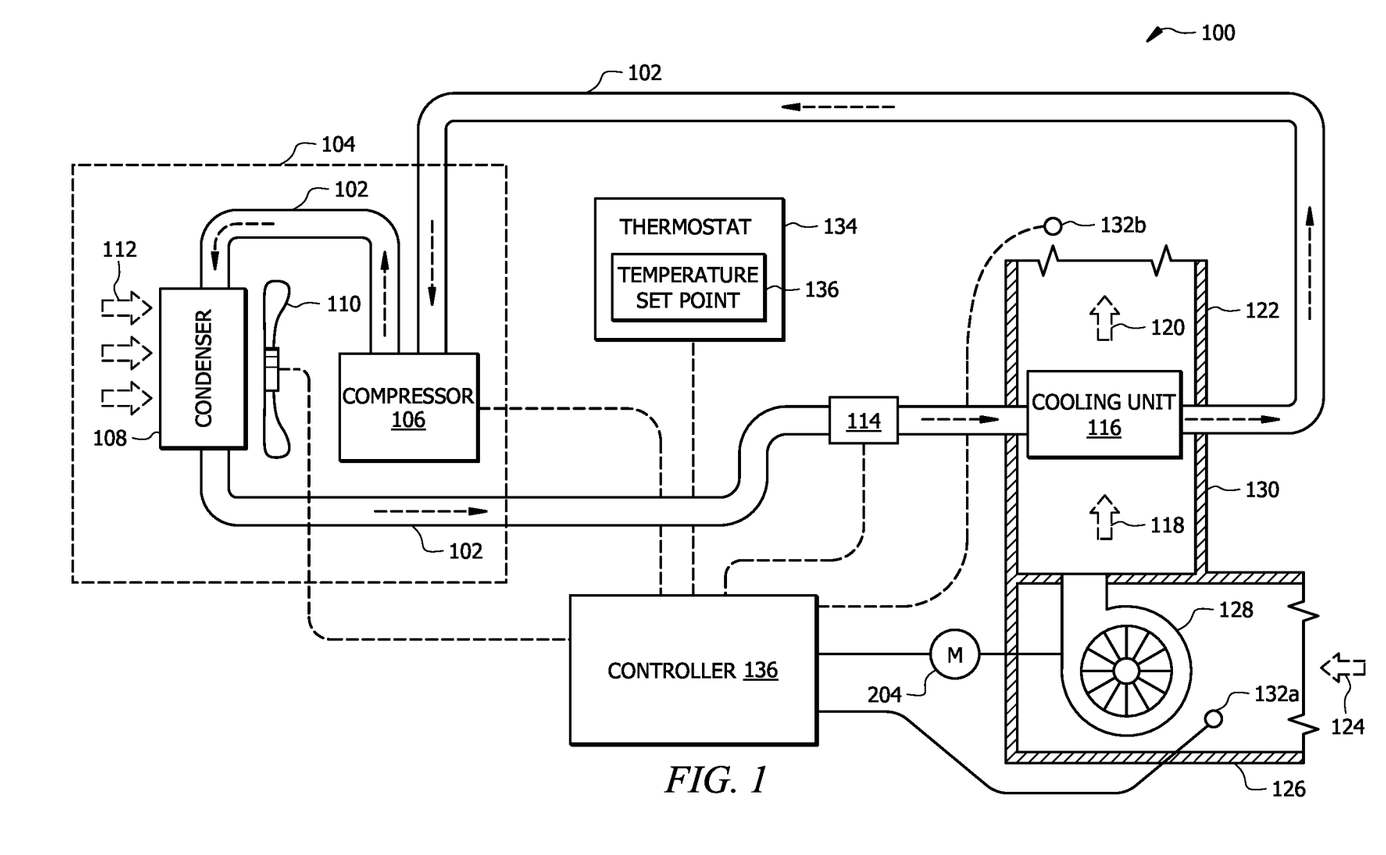
FIG. 1 illustrates a diagram of an example HVAC system which includes motor-driven components.

FIG. 1 illustrates a schematic diagram of an embodiment of an HVAC system 100. The HVAC system 100 conditions air for delivery to a conditioned space. Various components of the HVAC system 100 may be motor-driven components including, but not limited to, the compressor 106, the fan 110, and the blower 128, described in greater detail below. The conditioned space may be, for example, a room, a house, an office building, a warehouse, or the like. In some embodiments, the HVAC system 100 is a rooftop unit (RTU) that is positioned on the roof of a building and the conditioned air is delivered to the interior of the building. In other embodiments, portion(s) of the system may be located within the building and portion(s) outside the building. The HVAC system 100 may also include heating elements that are not shown here for convenience and clarity. The HVAC system 100 may be configured as shown in FIG. 1 or in any other suitable configuration. For example, the HVAC system 100 may include additional components or may omit one or more components shown in FIG. 1.

The HVAC system 100 includes a working-fluid conduit subsystem 102, a condensing unit 104, an expansion valve 114, a cooling unit 116, a thermostat 134, and a controller 138. The working fluid conduit subsystem 102 facilitates the movement of a working fluid (e.g., a refrigerant) through a cooling cycle such that the working fluid flows as illustrated by the dashed arrows in FIG. 1. The working fluid may be any acceptable working fluid including, but not limited to, fluorocarbons (e.g., chlorofluorocarbons), ammonia, non-halogenated hydrocarbons (e.g., propane), hydroflurocarbons (e.g., R-410A), or any other suitable type of refrigerant.

The condensing unit 104 includes a compressor 106, a condenser 108, and a fan 110. The compressor 106 is coupled to the working-fluid conduit subsystem 102 and compresses (i.e., increases the pressure of) the working fluid. The compressor 106 of condensing unit 104 may be a variable speed or multi-stage compressor. A variable speed compressor is generally configured to operate at different speeds to increase the pressure of the working fluid to keep the working fluid moving along the working-fluid conduit subsystem 102. In the variable speed compressor configuration, the speed of compressor 106 can be modified to adjust the cooling capacity of the HVAC system 100. Meanwhile, a multi-stage compressor may include multiple compressors, each configured to operate at a constant speed to increase the pressure of the working fluid to keep the working fluid moving along the working-fluid conduit subsystem 102. In the multi-stage compressor configuration, one or more compressors can be turned on or off to adjust the cooling capacity of the HVAC system 100.

The compressor 106 is in signal communication with the controller 138 using a wired or wireless connection. The controller 138 provides commands or signals to control the operation of the compressor 106. For example, the controller 138 may operate the compressor 106 in different modes corresponding to load conditions (e.g., the amount of cooling or heating required by the HVAC system 100). As described in greater detail with respect to FIG. 2 below, the compressor 106 may be a motor-driven component. Accordingly, the controller 138 may provide a signal to a motor-drive circuit which powers a motor associated with the compressor 106. The controller 138 is described in greater detail below with respect to FIG. 2.

The condenser 108 is generally located downstream of the compressor 106 and is configured to remove heat from the working fluid. The fan 110 is configured to move air 112 across the condenser 108. For example, the fan 110 may be configured to blow outside air through the condenser 108 to help cool the working fluid flowing therethrough. The fan 110 may be in signal communication with the controller 138 using a wired or wireless connection such that the controller 138 provides commands or signals to control the operation of the fan 110. The fan 110 may be a motor-driven component. The controller 138 may provide a signal to a motor-drive circuit which powers a motor associated with the fan 110. The cooled working fluid from the condenser 108 flows toward an expansion valve 114.

The expansion valve 114 is coupled to the working-fluid conduit subsystem 102 downstream of the condenser 108 and is configured to remove pressure from the working fluid. In this way, the working fluid is delivered to the cooling unit 116 and receives heat from airflow 118 to produce a conditioned airflow 120 that is delivered by a duct subsystem 122 to the conditioned space. In general, the expansion valve 114 may be a valve such as an expansion valve or a flow control valve (e.g., a thermostatic expansion valve (TXV) valve) or any other suitable valve for removing pressure from the working fluid while, optionally, providing control of the rate of flow of the working fluid. The expansion valve 114 may be in communication with the controller 138 (e.g., via wired and/or wireless communication) to receive control signals for opening and/or closing associated valves.

The cooling unit 116 is generally any heat exchanger configured to provide heat transfer between air flowing through the cooling unit 116 (i.e., contacting an outer surface of one or more evaporator coils associated with the cooling unit 116) and working fluid passing through the interior of the cooling unit 116. The cooling unit 116 is fluidically connected to the compressor 106, such that working fluid generally flows from the cooling unit 116 to the compressor 106.

A portion of the HVAC system 100 is configured to move air 118 across the cooling unit 116 and out of the duct sub-system 122 as conditioned air 120. Return air 124, which may be air returning from the building, fresh air from outside, or some combination, is pulled into a return duct 126. A suction side of the blower 128 pulls the return air 124 through the duct 126. The blower 128 discharges airflow 118 into a duct 130 from where the airflow 118 crosses the cooling unit 116 or heating elements (not shown) to produce the conditioned airflow 120. The blower 128 is any mechanism for providing a flow of air through the HVAC system 100. For example, the blower 128 may be a constant-speed or variable-speed circulation blower or fan. Examples of a variable-speed blower include, but are not limited to, belt-drive blowers controlled by inverters, direct-drive blowers with electronic commuted motors (ECM), or any other suitable types of blowers.

The blower 128 is in signal communication with the controller 138 using any suitable type of wired or wireless connection. The controller 138 is configured to provide commands or signals to the blower 128 to control its operation. The blower 128 may be a motor-driven component. The controller 138 may provide a signal to a motor-drive circuit which powers a motor associated with the blower 128.

The HVAC system 100 generally includes one or more sensors 132a,b in signal communication with the controller 138. The sensors 132a,b may include any suitable type of sensor for measuring air temperature as well as other properties of a conditioned space (e.g., a room or building). The sensors 132a,b may be positioned anywhere within the conditioned space, the HVAC system 100, and/or the surrounding environment. For example, as shown in the illustrative example of FIG. 1, the HVAC system 100 may include a sensor 132a positioned and configured to measure a return air temperature (e.g., of airflow 124) and a sensor 132b positioned and configured to measure a supply or treated air temperature (e.g., of airflow 120). In other examples, the HVAC system 100 may include sensors positioned and configured to measure any other suitable type of air temperature (e.g., the temperature of air at one or more locations within the conditioned space and/or an outdoor air temperature).

The HVAC system 100 includes one or more thermostats 134, for example, located within the conditioned space (e.g., a room or building). The thermostat 134 is generally in signal communication with the controller 138 using any suitable type of wired or wireless communications. The thermostat 134 may be a single-stage thermostat, a multi-stage thermostat, or any suitable type of thermostat as would be appreciated by one of ordinary skill in the art. The thermostat 134 is configured to allow a user to input a desired temperature via a temperature setpoint 136 for a designated space or zone such as a room in the conditioned space. The controller 138 may use information from the thermostat 134 such as the temperature setpoint 136 for controlling the compressor 106, the fan 110, and/or the blower 128.

As described above, in certain embodiments, connections between various components of the HVAC system 100 are wired. For example, conventional cable and contacts may be used to couple the controller 138 to the various components of the HVAC system 100, including, the compressor 106, the fan 110, the expansion valve 114, the blower 128, sensor(s) 132, and thermostat 134. In some embodiments, a wireless connection is employed to provide at least some of the connections between components of the HVAC system 100.

In some embodiments, a data bus couples various components of the HVAC system 100 together such that data is communicated therebetween. In a typical embodiment, the data bus may include, for example, any combination of hardware, software embedded in a computer readable medium, or encoded logic incorporated in hardware or otherwise stored (e.g., firmware) to couple components of HVAC system 100 to each other. As an example and not by way of limitation, the data bus may include an Accelerated Graphics Port (AGP) or other graphics bus, a Controller Area Network (CAN) bus, a front-side bus (FSB), a HYPERTRANSPORT (HT) interconnect, an INFINIBAND interconnect, a low-pin-count (LPC) bus, a memory bus, a Micro Channel Architecture (MCA) bus, a Peripheral Component Interconnect (PCI) bus, a PCI-Express (PCI-X) bus, a serial advanced technology attachment (SATA) bus, a Video Electronics Standards Association local (VLB) bus, or any other suitable bus or a combination of two or more of these. In various embodiments, the data bus may include any number, type, or configuration of data buses, where appropriate. In certain embodiments, one or more data buses (which may each include an address bus and a data bus) may couple the controller 138 to other components of the HVAC system 100.

Example Motor Inductance Calibration System

Figure 2:
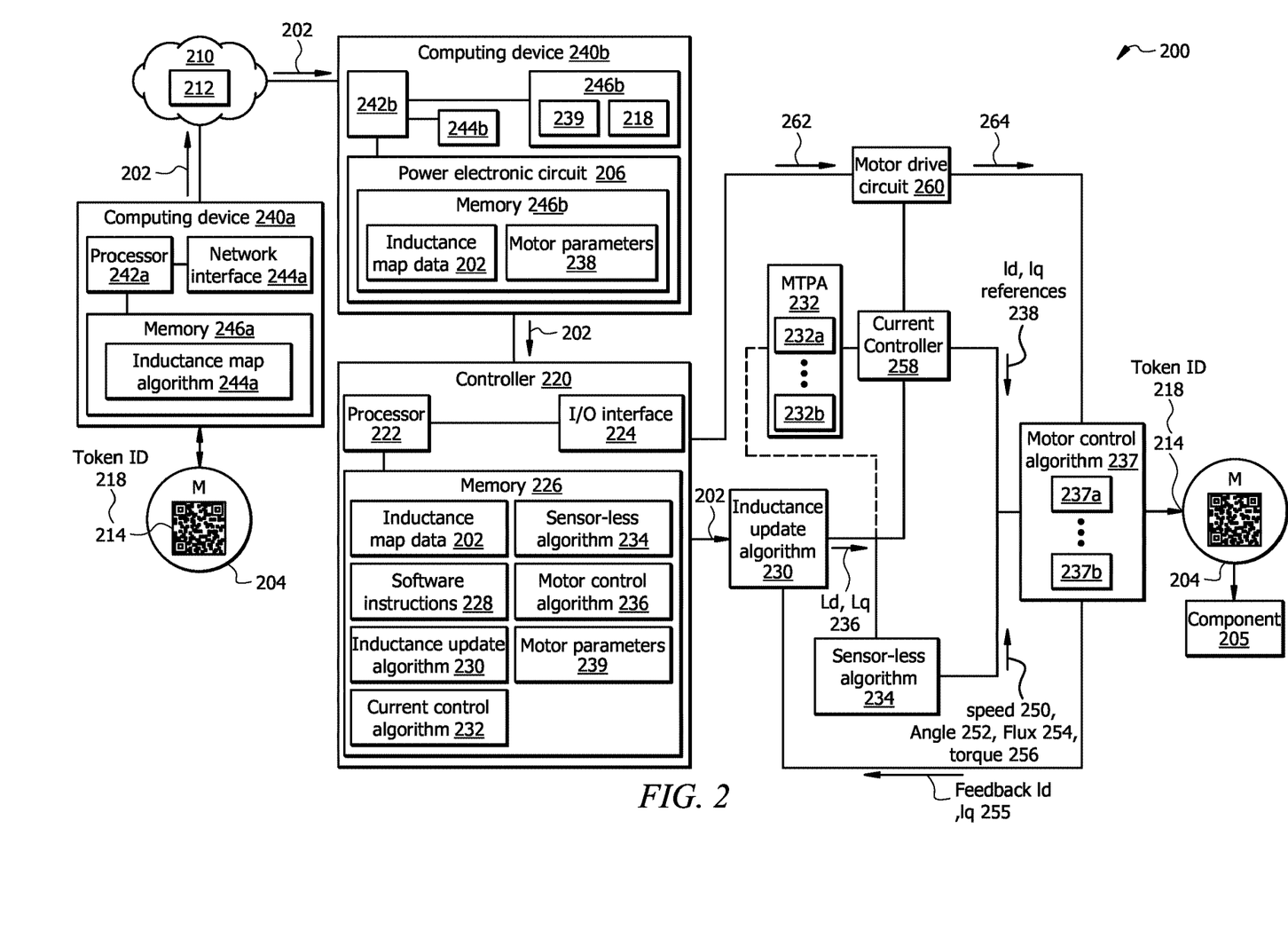
FIG. 2 illustrates a diagram of an example system configured to calibrate the inductance of a motor used in the HVAC system of FIG. 1.

FIG. 2 illustrates an example embodiment of a motor inductance calibration system 200. The system 200 includes a motor 204, a power electronic circuit 206, a server 212, a controller 220, computing devices 240a,b, and a motor drive circuit 260. The components of the system 200 may be coupled to one another via wires or wirelessly via a network 210. For example, the computing device 240 may be communicatively coupled with the power electronic circuit 206 and/or the controller 220 via the network 210. The motor-driven component 205 may be any of the components of the HVAC system 100, including the compressor 106, fan 110, or blower 128 of FIG. 1. The system 200 is generally configured to implement inductance calibration for the motor 204. In some embodiments, the system 200 may include fewer components or additional components than those described above.

In general, the system 200 may be configured to control the operations of the motor 204 based on motor parameters 239. The motor parameters 239 may include reference current, feedback current, voltage, torque, angle, speed, flux, and inductance associated with the motor 204, among others. In current approaches, the motor parameters 239 are taken as constants to model the circuit equivalent of motor 204. However, these approaches are not accurate because at least some of the motor parameters 239 may vary as the motor starts to operate. For example, the torque of the motor 204 may vary as the current applied to the motor 204 varies. In another example, the speed of the motor 204 may vary as the current applied to the motor 204 varies. In another example, the inductance values at the motor 204 may vary as the current applied to the motor 204 varies. The inductance model of the motor 204 may include a first inductance value in a direct axis (i.e., Ld) and a second inductance value in a quadrature axis (i.e., Lq). The Ld and Lq may be measured in a measurement unit henry (H) or milli-henry (mH). The direct axis (d-axis) refers to the component of the stator magnetic field that is in phase with the rotor magnetic field. The quadrature axis (q-axis) refers to the component of the stator magnetic field that is 90° out of phase with the rotor magnetic field. The d-axis is aligned with the rotor's magnetic field, while the q-axis is perpendicular to the d-axis. The inductance in the d-axis and q-axis are measures of the machine's ability to store energy in the magnetic field. Specifically, they are measures of the relationship between the magnetic flux (the amount of magnetic field passing through a surface) and the current flowing through the machine's windings in the d-axis and q-axis directions. Ld is a measure of the machine's ability to store energy in the magnetic field along the d-axis. Similarly, Lq is a measure of the machine's ability to store energy in the magnetic field along the q-axis.

System Components

Example Motor

In certain embodiments, the motor 204 may be an interior permanent magnet synchronous motor (PMSM) motor. The PMSM motor is a type of electric motor that uses permanent magnets to generate the magnetic field that drives the rotor, as opposed to an induction motor, which uses an electromagnetic field induced in the rotor. In a PMSM motor, the stator windings are energized with a three-phase AC current, which creates a rotating magnetic field that interacts with the permanent magnets in the rotor. The interaction between the stator and rotor magnetic fields generates torque and causes the rotor to rotate. An interior PMSM is a type of motor where the rotor is located inside the stator. In an interior PMSM, the permanent magnets are mounted on the rotor surface facing the stator core. The stator core has slots where the windings are placed to create the magnetic field. The rotor rotates within the stator, and the interaction between the magnetic fields of the rotor and stator generates torque. In interior PMSMs, the Ld Is less than Lq. The Ld and Lq may be determined using matrix transformation on the actual inductance values of inductors within the motor 204. These motor parameters may be determined to generate an equivalent circuit model of the electromechanical motor 204. The equivalent circuit model of the motor 204 may be used by the controller 220 to control the motor 204.

Accurate motor parameters 239 impact the motor efficiency and the equivalent circuit model of the motor 204. For example, if the Ld and Lq are inaccurate, the motor may not operate efficiently as intended. For example, resources to provide to the motor 204 may be overestimated. Thus, excess power resources (e.g., voltage and/or power signals) may be wasted trying to provide the motor 204 with the overestimated resources. If the Ld and Lq are calibrated and accurate, the current that is applied to the motor 204 can be controlled more precisely. The amount of current flowing through the windings of the motor 204 may affect the torque produced by the motor 204. Therefore, the current control also impact the torque control at the motor 204. By achieving a more accurate current control, a more accurate maximum torque per ampere (MTPA) control and maximum torque per voltage (MTPV) control for the motor may be achieved.

In current control for the motor 204, feedback current is received from the motor 204 and used to generate pulse signals 262 (e.g., pulse-width modulation (PWM) signals). The control signals 262 may include signals configured to instruct the motor drive circuit 260 to transmit motor drive signals 264 to the motor 204. For example, the control signals 262 may include instructions in form of signals, modulated signals, pulse-width modulation signals, and the like. In one example, the control signals 262 may include signals to activate (e.g., turn on) one or more transistors in the motor drive circuit 260 and deactivate (e.g., turn off) one or more transistors in the motor circuit 260 so that a DC voltage signal is sent from the motor drive circuit 260 to a first terminal of the motor 204 and a returning DC voltage signal is received from second and third terminals of the motor 204.

The signals 262 are fed to inverters within a motor drive circuit 260 that is configured to power the motor 204. The inverters may generate motor drive signals 264 based on the received signals 262. The motor drive circuit 260 may communicate the motor drive signals 264 to the motor 204. The motor 204 may be configured to operate the component 205. For example, the motor 204 may be configured to power the component 205 by communicating signals. The motor drive circuit 260 may receive control signals 262 from the controller 220 and send a motor drive signal 264 to the motor 204.

Motor drive circuit 260 is generally any appropriate circuit for providing the motor-drive signal 264 in order to drive the motor 204. For instance, the motor drive circuit 260 may be a direct current-alternating current (DC-AC) inverter circuit.

The MTPA and MTPV control algorithms are sensitive to the Ld and Lq values. Therefore, this is another reason to calibrate the Ld and Lq values and determine more accurate values of Ld and Lq based on the operating current fed to the motor 204. Because the inductance calibration of a motor also improves the efficiency of the motor, the method of inductance calibration described herein may also improve the operation of non-torque current controls as well.

The system 200 contemplates a method to calibrate the inductance model of the motor 204 for every current and every operation of the motor 204. The system 200 is configured to update the inductance values (i.e., Ld and Lq) of the motor 204 based on the operating/feedback current that is applied to the motor 204. Therefore, more accurate inductance values for Ld and Lq are used for determining other motor parameters 239, such as current in the direct axis (Iq) reference, current in the quadrature axis (Iq) reference, speed, angle, flux, and torque, among other parameters. This leads to a practical application of conserving power resources that would otherwise be provided to the motor 204 due to overestimated power/voltage needs. Furthermore, the system 200 may provide an additional practical application of improving the current control and the motor control by determining the more accurate and calibrated inductance values (i.e., Ld and Lq). This, in turn, leads to improving the overall operation of the motor 204.

Network

Network 210 may be any suitable type of wireless and/or wired network including, but not limited to, all or a portion of the Internet, an Intranet, a private network, a public network, a peer-to-peer network, the public switched telephone network, a cellular network, a local area network (LAN), a metropolitan area network (MAN), a wide area network (WAN), and a satellite network. The network 210 may be configured to support any suitable type of communication protocol as would be appreciated by one of ordinary skill in the art.

Computing Device

Each of the computing devices 240a and 240b is an instance of a computing device 240. A computing device 240 is generally any device that is configured to process data and interact with users. Examples of the computing device 240 include but are not limited to, a personal computer, a desktop computer, a workstation, a server, a laptop, a tablet computer, a mobile phone (such as a smartphone), or any other suitable type of device. The computing device 240 may include a user interface, such as a display, a microphone, a camera, a keypad, or other appropriate terminal equipment usable by users. Each computing device 240 may include a hardware processor 242, network interface 244, and memory 246 configured to perform any of the functions or actions of the computing device 240 described herein. For example, a software application designed using software code may be stored in the memory and executed by the processor to perform the functions of the computing device 240. Each computing device 240 is configured to communicate with other devices and components of the system 200 via the network 210. For example, the computing device 240a may communicate the inductance map data 202 to the computing device 240b via the network 210 in response to the inductance map data 202 being generated by the inductance map algorithm 216. The computing device 240a may be located at a motor manufacturing facility where motors 204 are manufactured. In another example, the computing device 240b may receive the inductance map data 202 and forward it to the power electronic circuit 206. The inductance map data 202 may include inductance map data for multiple motor types. When the motor 204 is assigned to a motor drive circuit 260, a particular inductance map data 202 that is associated with the motor 204 is transmitted to the controller 220.

The computing device 240a may include the processor 242a operably coupled to the network interface 244a and the memory 246a. The computing device 240b may include the processor 242b operably coupled to the network interface 244b, the memory 246b, and power electronic circuit 206. Each of the processors 242a and 242b may be an instance of the processor 242. The processor 242 includes one or more processors operably coupled to the memory 246. The processor 242 is any electronic circuitry including, but not limited to, state machines, one or more central processing unit (CPU) chips, logic units, cores (e.g., a multi-core processor), field-programmable gate array (FPGAs), application specific integrated circuits (ASICs), or digital signal processors (DSPs) that communicatively couples to memory 246. The processor 242 may be a programmable logic device, a microcontroller, a microprocessor, or any suitable combination of the preceding. The processor 242 is communicatively coupled to and in signal communication with the memory 246. The one or more processors are configured to process data and may be implemented in hardware or software. For example, the processor 242 may be 8-bit, 16-bit, 32-bit, 64-bit or of any other suitable architecture. The processor 242 may include an arithmetic logic unit (ALU) for performing arithmetic and logic operations, processor registers that supply operands to the ALU and store the results of ALU operations, and a control unit that fetches instructions from memory 246 and executes them by directing the coordinated operations of the ALU, registers, and other components. The processor may include other hardware and software that operates to process information and perform any of the functions described herein (e.g., with respect to FIGS. 1-4). The processor 242 is not limited to a single processing device and may encompass multiple processing devices.

Each of the network interfaces 244a and 244b may be an instance of the network interface 244. The network interface 244 is configured to communicate data and signals with other devices. For example, the network interface 244 may comprise a local area network (LAN) interface, a wide area network (WAN) interface, a metropolitan area network (MAN) interface, a modem, a switch, and/or a router. The processor 242a,b may be configured to send and receive data using the network interface 244a,b, respectively. The network interface 244 may be configured to enable wired and/or wireless communications. For example, the network interface 244a may be configured to communicate the inductance map data 202 to the computing device 240b and power electronic circuit 206 via the network 210. In another example, the network interface 244b may be configured to communicate the inductance map data 202 to the controller 220.

Each of the memories 246a and 246b may be an instance of the memory 246. The memory 246 includes one or more disks, tape drives, or solid-state drives, and may be used as an over-flow data storage device, to store programs when such programs are selected for execution, and to store instructions and data that are read during program execution. The memory 246 may be volatile or non-volatile and may include ROM, RAM, ternary content-addressable memory (TCAM), dynamic random-access memory (DRAM), and static random-access memory (SRAM). The memory 246a is operable to store inductance map algorithm 216 and any other software code that when executed by the processor 242a cause the processor 242a to perform one or more operations of the computing device 240a described herein. The memory 246b is operable to store software instructions 228 and token identification (ID) 218. When the software instructions 228 is executed by the processor 242b cause the processor 242b to perform one or more operations of the computing device 240b.

The inductance map algorithm 216 may be implemented by the processor 242a executing software code associated with the inductance map algorithm 216. The inductance map algorithm 216 may include code that when executed, control signals may be applied to the motor 204 to inject various combinations of currents into the motor 204. When the motor 24 is manufactured at the factory, by executing the inductance map algorithm 216, the motor 204 is run through multiple operation scenarios where different values of currents are fed to the motor 204. The control signals may induce Id and Iq current values along the direct and quadrature axes of the motor 204, similar to that described above. The Id and Iq current values lead to respective Ld and Lq inductance values. In response, the Ld and Lq are measured for every combination of Id and Iq in the form of a three-dimensional (3d) array or vector. Example 3d plots of the Ld as a function of Id and Iq. and Lq as a function of Id and Iq are illustrated in FIGS. 3A and 3B, respectively.

Figure 3A:
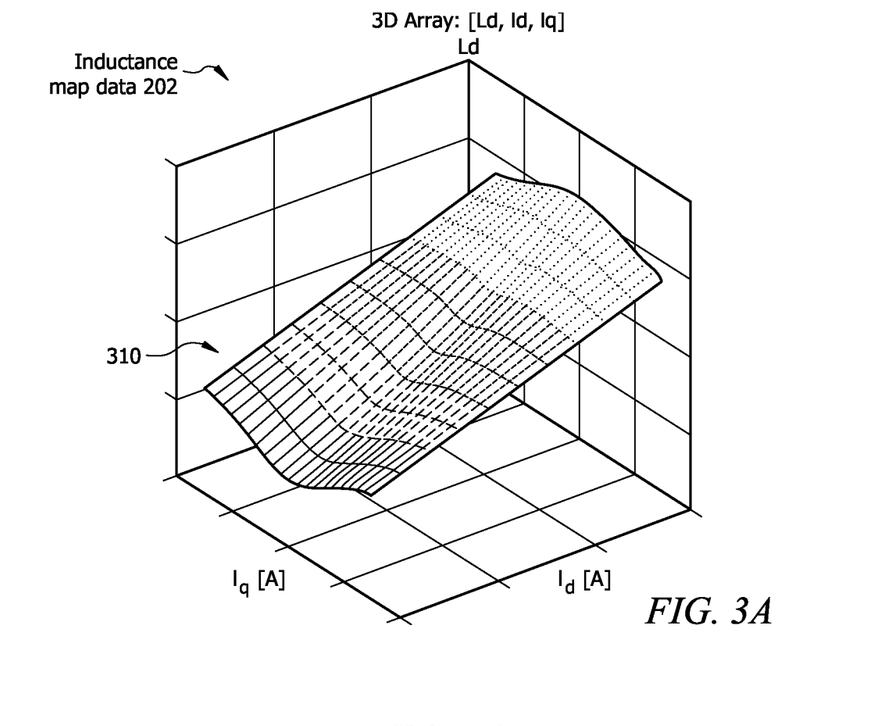
FIGS. 3A and 3B illustrate example plots of inductance map data used by the system of FIG. 2.

Referring to FIG. 3A, a 3d plot 310 shows the values of Ld as a function of Id and Iq. The values of Ld as a function of Id and Iq may be represented as Ld in Z axis, Id in X axis, Iq in Y-axis: Ld=f1 (Id, Iq), where the f1 is a first polynomial function that fits the plot 310. The polynomial function f1 may be determined by the computing device 240a executing the inductance map algorithm 216 and/or by the controller 220 executing software instructions 228.

Figure 3B:
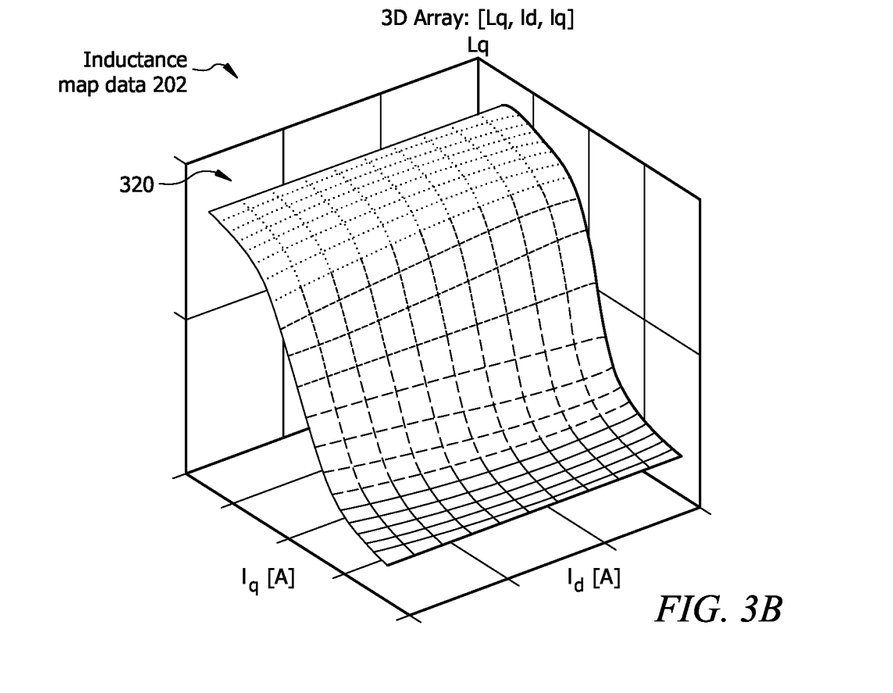

Referring to FIG. 3B, a 3d plot 320 shows the values of Lq as a function of Id and Iq. The values of Lq as a function of Id and Iq may be represented as Ld in Z axis, Id in X axis, Iq in Y-axis: Ld=f2 (Id, Iq), where the f2 is a second polynomial function that fits the plot 320. The polynomial function f2 may be determined by the computing device 240a executing the inductance map algorithm 216 and/or by the controller 220 executing software instructions 228. Referring back to FIG. 2, the inductance map data 202 may be represented by a 3d table, a 3d vector, polynomial functions f1 and f2, and the like.

In certain embodiments, the coefficient values of polynomial functions f1 and f2 associated with the inductance map data 202 may be encoded into a quick response (QR) code 214. The QR code 214 may be attached to the motor 204.

When the motor 204 is shipped to an assembly facility where components of the HVAC system 100 are assembled, the QR code 214 may be scanned by a QR code scanner. In response, the coefficients of the polynomial functions f1 and f2 may be determined. Based on the determined coefficients, the inductance map data 202 may be determined by the controller 220 and/or the computing device 240b associated with the power electronic circuit 206.

In certain embodiments, the inductance map data 202 may be stored in a cloud, such as a database or a server 212 in the network 210 that is associated with and in signal communication with other components of the system 200. The server 212 is generally any computing device that is configured to store data, such as the inductance map data 202 and communicate with other devices. For example, the server 212 may be a virtual machine, a desktop computer, a workstation, and the like. The server 212 may include a hardware processor, network interface, and memory (not shown) configured to perform any of the functions or actions of the server 212 described herein. For example, a software application designed using software code may be stored in the memory and executed by the processor to perform the functions of the server 212.

The inductance map data 202 may be associated with a token identification (ID) 218. The token ID 218 may be or include a serial number associated with the motor 204, for example. The token ID 218 may be used for authentication purposes and providing access to the inductance map data 202 in response to validation of the token ID 218. The token ID 218 may be encoded into the QR code 214. When the QR code 214 is scanned by a QR code scanner, the taken ID 218 may be verified. For example, a user may scan the QR code 214 and be prompted to provide the token ID 218. The QR code scanner may be operably coupled with the computing device 240b. The user may be prompted on a display screen of the computing device 240b to provide the token ID 218. The user may input the token ID 218 to the computing device 240b. In other examples, the user may input the token ID 218 to a computing device associated with the motor 204, and/or controller 220.

The token ID 218 may be validated by the computing device 240b. For example, the token ID 218 may be compared with an initial token ID previously stored in a memory of the computing device 240b. If the user-provided token ID 218 corresponds to the initial token ID, the multi-dimensional lookup table that is stored in the server 212 and represents the inductance map data 202 may be communicated from the server 212 to the computing device 240b and the power electronic circuit 206.

Example Power Electronic Circuit

The power electronic circuit 206 is generally any appropriate circuit for receiving the inductance map data 202 and providing the inductance map data 202 to the controller 220. Although in the illustrated embodiment, the power electronic circuit 206 is shown within the computing device 240b, in other embodiments, the power electronic circuit 206 may reside outside the computing device 240b and be communicatively coupled to the computing device 240b and other components of the system 200. The power electronic circuit 206 may include a memory 246b and processing circuitry configured to perform the functions of the power electronic circuit 206 when code stored in the memory 246b is executed by the processing circuitry.

In some embodiments, the memory 246b may be volatile or non-volatile, and include an electrically erasable programmable read only memory (EEPROM), ROM, RAM, TCAM, DRAM, and SRAM. The memory 246b may be configured to store the inductance map data 202, motor parameters 239, among any other data/instructions that facilitate the operations of the power electronic circuit 206. The inductance map data 202 that is received from the computing device 240b may include multiple inductance map data, where each of the inductance map data is associated with a different motor type, such as a first interior PMSM motor type, a second interior PMSM motor type, etc. When a motor drive circuit 260 is assigned to the motor 204, the power electronic circuit 206 may communicate the particular inductance map data 202 that is associated with the motor 204 to the controller 220. The controller 220 may use the received inductance map data 202 for calibrating the inductance values Ld and Lq and determining and updating other motor parameters 239, including the Id, Iq, speed, angle, flux, and torque, etc. These operations are described in greater details further below in conjunction with the discussion of the operational flow of the system 200.

Example Controller

The controller 220 may be controller 138 of FIG. 1. The controllers 220 may include a processor 222, a memory 226, and an input/output (I/O) interface 224. The components of the controller 220 may be in signal communication with each other. The memory 226 stores software instructions 228 that when executed by the processor 222 cause the processor 222 to perform one or more operations of the controller 220 described herein. In other embodiments, the controller may include fewer components or additional components than those described above.

The processor 222 includes one or more processors operably coupled to the memory 226. The processor 222 is any electronic circuitry including, but not limited to, state machines, one or more CPU chips, logic units, cores (e.g., a multi-core processor), FPGAs, ASICs, or DSPs that communicatively couples to memory 226 and controls the operation of HVAC system 100 (see FIG. 1). The processor 222 may be a programmable logic device, a microcontroller, a microprocessor, or any suitable combination of the preceding. The processor 222 is communicatively coupled to and in signal communication with the memory 226. The one or more processors are configured to process data and may be implemented in hardware or software. For example, the processor 222 may be 8-bit, 16-bit, 32-bit, 64-bit or of any other suitable architecture. The processor 222 may include an ALU for performing arithmetic and logic operations, processor registers that supply operands to the ALU and store the results of ALU operations, and a control unit that fetches instructions from memory 226 and executes them by directing the coordinated operations of the ALU, registers, and other components. The processor may include other hardware and software that operates to process information, control the HVAC system 100 (see FIG. 1), and perform any of the functions described herein (e.g., with respect to FIGS. 1-4). The processor 222 is not limited to a single processing device and may encompass multiple processing devices. Similarly, each of the controllers 220 is not limited to a single controller but may encompass multiple controllers.

The memory 226 includes one or more disks, tape drives, or solid-state drives, and may be used as an over-flow data storage device, to store programs when such programs are selected for execution, and to store instructions and data that are read during program execution. The memory 226 may be volatile or non-volatile. The memory 226 may include ROM, RAM, TCAM, DRAM, and SRAM. The memory 226 is operable to store software instructions 228 that when executed by the processor 222 cause the processor 222 to perform one or more operations of the controller 220 described herein. The memory 226 may further store inductance update algorithm 230, MTPA algorithm 232, sensor-less algorithm 234, motor control algorithm 237, the inductance map data 202, motor parameters 239, and/or any other data/instructions described in FIGS. 1-4.

Inductance update algorithm 230 may be implemented by the processor 222 executing the software instructions 228 and is generally configured to update the inductance values Lq and Lq 236 of the motor 204 based on the feedback Id and Iq currents 255 received from the motor 204 and the Id and Iq in the inductance map data 202 that lead to the Ld and Lq 236 as indicated by the inductance map data 202. The inductance update algorithm 230 may be an application programming interface (API). The inductance update algorithm 230 may be configured to receive the feedback Id and Iq currents 255. In response, the inductance update algorithm 230 may search for the corresponding Id and Iq in the inductance map data 202. In response to finding or identifying the Id and Iq currents 255 in the inductance map data 202, the inductance update algorithm 230 may fetch, from the inductance map data 202, the Ld and Lq 236 associated with or linked to the identified Id and Iq currents 255. The inductance update algorithm 230 may then update the Lq and Lq of the motor 204 to be equal to the newly-fetched Ld and Lq 236. The inductance update algorithm 230 may perform this operation continuously, periodically, for example, every 0.01 seconds, 0.02 seconds, and the like, or on demand, for example, in response to a request from the controller 220 when the motor 204 is ready to run and is assigned to the motor drive circuit 260. The inductance update algorithm 230 may feed the determined Ld and Lq 236 to the MTPA algorithm 232, current controller 258, and the sensor-less algorithm 234 for further processing.

MTPA algorithm 232 may be implemented by the processor 222 executing the software instructions 228 and is generally configured to provide an increased torque production per ampere of current supplied to the motor 204 while reducing the energy consumption of the motor 204 based at least on the Lq and Lq 236 received from the inductance update algorithm 230. Using the MTPA algorithm 232 may be advantages to improve the efficiency in the torque production of the motor 204. In certain embodiments, using the MTPA algorithm 232 may be optional as indicated in FIG. 2 by the dashed line from the inductance update algorithm 230 to the MTPA algorithm 232. The MTPA algorithm 232 may include MTPA algorithms 232a and 232b, among others. Examples of a MTPA algorithm 232 may include an outdoor compressor speed MTPA control, outdoor condenser speed MTPA control, indoor torque MTPA control, and the like. The MTPA algorithm 232 may include algorithms for different components that are controlled by the motor 204. The updated Ld and Lq 236 may be forwarded to a MTPA algorithm 232 that is associated with a motor 204 for controlling a particular component of the HVAC system 100 of FIG. 1. For example, if the motor 204 is for controlling a first component 205 of the HVAC system 100 of FIG. 1, the Ld and Lq 236 are fed to the MTPA algorithm 232a that is associated with the motor 204 that is for controlling the first component 205. The component 205 may be any component of the HVAC system 100 in FIG. 1, such as the compressor 106, fan 110, blower 128, condenser 108 of FIG. 1. In certain embodiments, the MTPA algorithm 232 may provide output (e.g., torque value for the motor 204) to the current controller 258. In certain embodiments, in addition or alternative to the MTPA algorithm 232, the updated Ld and Lq 236 may be fed to an MTPV algorithm. The MTPV algorithm may be executed by the processor 222 executing software instructions 228 and is generally configured to provide an increased torque production per voltage supplied to the motor 204 while reducing the energy consumption and voltage stress on the motor 204 based at least on the Lq and Lq 236 received from the inductance update algorithm 230. In certain embodiments, using the MTPV algorithm may be advantages to improve the efficiency in the torque production of the motor 204 but may be optional. The MTPV algorithm may include algorithms for different components that are controlled by the motor 204. The updated Ld and Lq 236 may be forwarded to a first MTPV algorithm that is associated with a motor 204 for controlling a first component of the HVAC system 100 of FIG. 1, and to a second MTPV algorithm that is associated with a motor 204 for controlling a second component of the HVAC system 100 of FIG. 1.

Sensor-less algorithm 234 may be implemented by the processor 222 executing the software instructions 228 and is generally configured to determine the speed 250, angle 252, flux 254, and torque 256 associated with the motor 204 based at least on the updated Ld and Lq 236 received from the inductance update algorithm 230. The speed 250 may be associated with the rotor associated with the motor 204. The speed 250 may be the speed at which the motor 204 or the rotor associated with the motor 204 rotates along its central axis. The angle 252 may be an angle between the position of a rotor associated with the motor 204 and the magnetic field of a stator associated with the motor 204. The flux 254 may be generated by the flow of electric current through windings of the motor 204. The flux 254 may generate force for the rotor of the motor 204 to rotate. The torque 256 may be a torque generated in the motor 204 due to an interaction between a magnetic field of a stator and a rotor associated with the motor 204. The sensor-less algorithm 234 may be implemented to generate an equivalent circuit model of the motor 204. The same or similar signals may be applied to the motor 204 and the circuit model of the motor 204 to simulate the behavior of the motor 204 in response to the signals. In this manner, the behavior of the motor 204 may be simulated to analyze the operation of the motor 204 in different conditions. In certain embodiments, the sensor-less algorithm 234 may include functions that are configured to calculate the speed 250, angle 252, flux 254, and torque 256, respectively, when provided with at least the Ld and Lq 236, such as, speed=f1 (Ld and Lq . . . ), angle=f2 (Ld, Lq . . . ), flux=f3 (Ld, Lq . . . ), and torque=f4 (Ld, Lq . . . ), where each of the f1 to f4 may be any suitable function that calculates the respective speed 250, angle 252, flux 254, and torque 256 when given the Ld and Lq, among other parameters. The speed 250, angle 252, flux 254, and torque 256 may be used as feedback values in controlling the operations of the motor 204. The sensor-less algorithm 234 may provide output to the motor control algorithm 237.

Motor control algorithm 237 may be implemented by the processor 222 executing the software instructions 228 and is generally configured to control the operations of the motor 204 based on the motor parameters 239, including but not limited to, the Id and Iq references 238, speed 250, angle 252, flux 254, and torque 256, among others. The motor control algorithm 237 may include the motor control algorithms 237a and 237b, among others. Examples of the motor control algorithms 237 may include an outdoor compressor speed control, outdoor condenser speed control, indoor torque speed control, and the like. The motor control algorithms 237 may include different motor control algorithms for different components of the HVAC system 100 of FIG. 1 that are controlled by the motor 204. The Id and Iq references 238, speed 250, angle 252, flux 254, and torque 256 may be forwarded to a motor control algorithm 237 that is associated with a motor 204 for controlling a particular component of the HVAC system 100 of FIG. 1. For example, if the motor 204 is for controlling a first component 205 of the HVAC system 100 of FIG. 1, the Id and Iq references 238, speed 250, angle 252, flux 254, and torque 256 are fed to the motor control algorithm 237 that is associated with the motor 204 for controlling the first component 205.

Current controller 258 may include a hardware circuitry and/or software algorithm implemented by the processor 222 executing instructions 228 and is configured to determine the Id and Iq references 238 based at least on the Ld, Lq 236 from the inductance update algorithm 230. In certain embodiments, the current controller 258 may be associated with and/or include a function that is configured to calculate the Id and Iq references 238 when provided with the updated Ld and Lq 236, such as Id, Iq references=f (Ld and Lq . . . ), where f may be any suitable function that calculates Id, Iq references when given Ld and Lq, among other parameters. The current controller 258 may regulate and control the current flowing through the windings of the motor 204. The current controller 258 may maintain the desired current level in the windings of the motor 204, which in turn, determines the torque of the motor 204. By providing the updated Ld and Lq 236 to the current controller 258, the current controller 258 is able to regulate the current level of the motor 204 (e.g., provide the Id an Iq references 238) to increase the overall efficiency of the motor 204. In certain embodiments, the current controller 258 may also use the input from the MTPA algorithm 232 in determining the Id and Iq references 238. The current controller 258 may provide the Id and Iq references 238 to the motor drive circuit 260. The motor drive circuit 260 may include pulse-width modulation (PWM) signal generator circuitry, inventor circuitry, among other circuitries that are configured to generate provide motor drive signals 264 to the motor control algorithm 237. The motor drive circuit 260 may receive the control signal 262 from the controller 220 and the Id and Iq references 238 from the current controller 258. The motor drive circuit 260 may generate motor drive signals 264 and feed them to the motor control algorithm 237 to control the motor 204.

Motor Inductance Calibration Operational Flow

In operation, the system 200 may first determine the inductance map data 202. For example, different current combinations may be applied to the motor 204 and, in response, Ld and Lq of the motor 204 may be measured. The inductance map data 202 may include a set of inductance values Ld and Lq associated with respective Iq and Iq, similar to that described above and shown in FIGS. 3A and 3B. Each of the inductance values may be measured when a respective current is applied to the motor 204.

In certain embodiments, the coefficients of polynomial equations that fit the plots (see FIGS. 3A and 3B) that represent the inductance map data 202 may be stored in the QR code 214. In such embodiments, when the QR code 214 is scanned, the coefficients of the polynomial equations can be determined. The QR code 214 may be scanned by a QR code scanner operably coupled with the computing device 240a,b. When the QR code 214 is scanned, the coefficients of the polynomial equations may be communicated to the computing device 240b and the power electronic circuit 206. The inductance map data 202 may be determined based on the coefficients. In this manner, the information that leads to obtaining the inductance map data 202 is condensed into the coefficients of the polynomial equations. Therefore, the memory and processing resources that would otherwise be spent to maintain the full size of the inductance map data 202 are conserved. In certain embodiments, the coefficients of polynomial equations that fit the plots (see FIGS. 3A and 3B) that represent the inductance map data 202 may be stored in the cloud (e.g., server 212). When the QR code 214 is scanned by the QR cod scanner, the coefficients of the polynomial equations may be retrieved from the server 212 and communicated/downloaded to the computing device 240b and/or the power electronic circuit 206 upon validating the token ID 218.

In certain embodiments, the multi-dimensional lookup table that includes the Ld, Lq, and respective Id and Iq along with the token ID 218 may be stored in the server 212. The token ID 218 may be encoded in the QR code 214. The inductance map data 202 may be downloaded upon verification of the token ID 208, similar to that described above. In such embodiments, when the QR code 214 is scanned and token ID 218 is verified, the multi-dimensional lookup table may be downloaded to the computing device 240b and/or the power electronic circuit 206 from the server 212.

The inductance map data 202 may be maintained in the EEPROM memory 246b associated with the power electronic circuit 206. When the motor 204 is assigned to a motor drive circuit 260 that is configured to power the motor 204, the controller 220 may receive a particular inductance map data 202 from among multiple inductance map data 202 for the motor 204, similar to that described above. In other words, when the controller 220 determines that the motor 204 is ready for operation or is in operation, the controller 220 may perform one or more of the following operations. The controller 220 may determine the feedback current value (i.e., Id and Iq 255) with which the motor 204 is being operated. The feedback currents Id and Iq 255 may be stable current values that do not fluctuate over any temperature variations, supply voltage variations, or load variations with respect to the motor 204. The controller 220 may feed the feedback currents 255 to the inductance update algorithm 230.

The inductance update algorithm 230 determines the updated Ld and Lq 236 associated with the feedback currents 255 from the inductance map data 202, similar to that described above. In this process, the controller 220 may search for the current values 255 in the inductance map data 202 and identify the inductance values (Ld and Lq 236) associated with the current values 255. The controller 220 may feed the Ld and Lq 236 to the current controller 258. The current controller 258 may determine the Id and Iq references 238 based on the provided Ld and Lq 236, similar to that described above. The controller 220 may also feed the Ld and Lq 236 to the sensor-less algorithm 234. The sensor-less algorithm 234 may determine the speed 250, angle 252, flux 254, and torque 256 based at least on the Lq and Lq 236, similar to that described above. Optionally, the controller 220 may feed the Ld and Lq 236 to the MTPA algorithm 232 (and MTPV algorithm). The MTPA algorithm 232 (and MTPV algorithm), may determine the torque production for the motor 204 based on the provided Ld and Lq 236, similar to that described above.

The current controller 258 may provide the Id and Iq references 238 to the motor drive circuit 260 and the motor control algorithm 237. The motor drive circuit 260 may also receive control signals 262 from the controller 220. In response, the motor drive circuit 260 may generate the motor drive signals 264 and communicate the motor drive signals 264 to the motor control algorithm 237.

The Id, Iq references 238, speed 250, angle 252, flux 254, and torque 256 may be fed to the motor control algorithm 237. The motor control algorithm 237 may control the operations of the motor 204 based on the received motor parameters (including the motor drive signals 264, Id, Iq references 238, etc.) and other motor parameters 239. The motor 204 may operate using the updated Ld and Lq 236, and Id, Iq references 238, speed 250, angle 252, flux 254, and torque 256 determined from the updated Ld and Lq 236. These parameters may be updated as the feedback currents Iq and Iq 255 are changed. These operations may be repeated periodically in a loop, for example, every 0.01 seconds, 0.02 seconds, or in response to detecting a change in the feedback currents Id and Iq 255.

Although certain embodiments are described to obtain updated inductance values Ld and Lq 236, the present disclosure is not limited to obtaining inductance values to control a motor 204. One of ordinary skill in the art would recognize other embodiments in light of the present disclosure. For example, in certain embodiments, the system 200 may be adapted to measure and determine any motor parameter at a manufacturing line independently from the control operation of the motor and the assembly line of the motor. For example, the measured motor parameter may be used to generate a table (e.g., plot, and/or equation) that represents the different values of the motor parameter. The generated table may be stored in a cloud server. The motor may be tokenized, for example, by a QR code encoded with information that when the QR code is scanned, causes the table to be retrieved from the cloud server. When the motor is in the assembly line and/or assigned with a motor drive circuit, the motor parameter may be fetched or determined from the table and used to control the motor.

Example Motor Inductance Calibration Method

Figure 4:
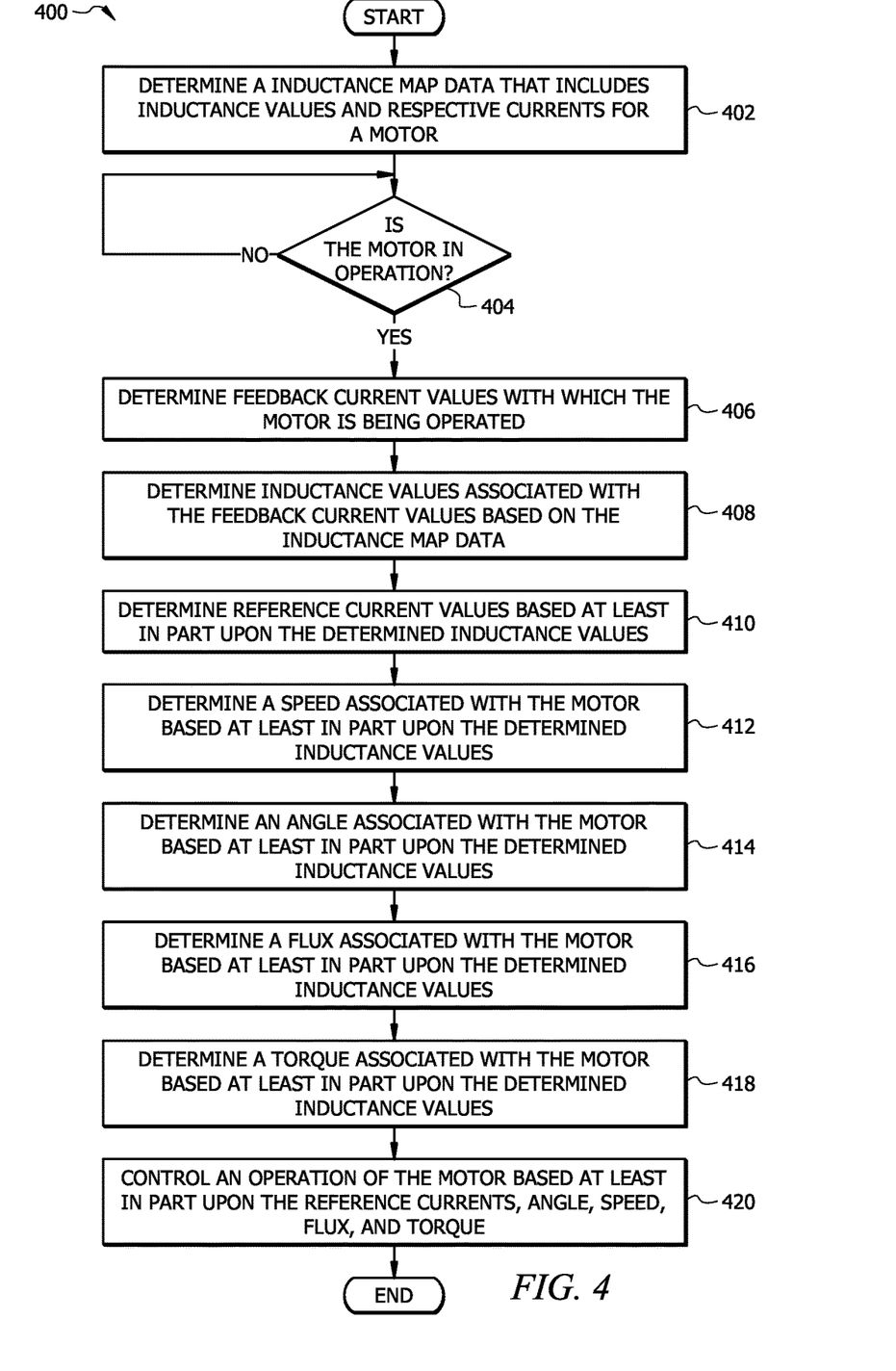
FIG. 4 illustrates a flowchart illustrating an example method for calibrating the inductance of a motor used in the HVAC system of FIG. 1.

FIG. 4 illustrates an example method 400 of system 200 of FIG. 2 for calibrating the Ld and Lq of the motor 204. Modifications, additions, or omissions may be made to method 400. Method 400 may include more, fewer, or other operations. For example, operations may be performed in parallel or in any suitable order. While at times discussed as the system 100, system 200, the controller 220, or components of any of thereof performing operations, any suitable system or components of the system may perform one or more operations of the method 400. For example, one or more operations of method 400 may be implemented, at least in part, in the form of software instructions 228 of FIG. 2, stored on tangible non-transitory computer-readable media (e.g., memory 226 of FIG. 2) that when run by one or more processors (e.g., processor 222 of FIG. 2) may cause the one or more processors to perform operations 402-416.

At operation 402, the controller 220 determines the inductance map data 202 that includes inductance values (Ld and Lq) and respective current values (Id and Iq) for a motor 204. In certain embodiments, determining the inductance map data 202 may be in response to obtaining and retrieving the inductance map data 202 from the server 212 when the QR code 214 is scanned, similar to that described in FIG. 2. In certain embodiments, determining the inductance map data 202 may be in response to obtaining the inductance map data 202 from the coefficients of the polynomial equations that represent the Ld and Lq as functions of Id and Iq by scanning the QR code 214 and downloading the coefficients of the polynomial equations, similar to that described in FIG. 2. In certain embodiments, determining the inductance map data 202 may be in response to obtaining the coefficients of the polynomial equations that represent the Ld and Lq as functions of Id and Iq by scanning the QR code 214 and generating the inductance map data 202 from the received the coefficients of the polynomial equations, similar to that described in FIG. 2. In certain embodiments, determining the inductance map data 202 may include receiving a scan of a QR code 214 that is encoded with coefficient values of two polynomial equations f1 and f2, accessing the coefficient values in response to receiving a scan of the QR code 214, and determining the inductance map data 202 based on the coefficient values, similar to that described in FIGS. 2 and 3. The f1 polynomial equation may output Ld as a function of Id and Iq, and the f2 polynomial equation may output Lq as a function of Id and Iq. In certain embodiments, determining the inductance map data 202 may include receiving a scan of the QR code 214 that is encoded with a token ID 218 that is associated with the motor 204, determining whether the token ID 218 is verified, and in response to determining that the token ID 218 is verified, receiving the inductance map data 202, e.g., by downloading inductance map data 202 from the server 212.

At operation 404, the controller 220 determines whether the motor 204 is in operation. The controller 220 may determine that the motor 204 is in operation if it is determined that the motor 204 is assigned to a motor drive circuit 260 and/or the motor 204 is switched on. If it is determined that the motor 204 is in operation, the method 400 may proceed to operation 406. Otherwise, method 400 waits at operation 404 until it is determined that the motor 204 is in operation.

At operation 406, the controller 220 determines the feedback currents Id and Iq 255 with which the motor 204 is being operated. For example, the controller 220 may receive the feedback currents Id and Iq 255 from the motor 204.

At operation 408, the controller 220 determines inductance values (i.e., Ld and Lq 236) associated with the feedback currents Id and Iq 255 based on the inductance map data 202. For example, the controller 220 may determine the inductance values Ld and Lq 236 by implementing the inductance update algorithm 230, similar to that described in FIG. 2.

At operation 410, the controller 220 determines the reference currents Id and Iq references 238 based at least on the determined inductance values Ld and Lq 236. For example, the controller 220 may determine the reference currents Iq and Iq references 238 by implementing the current controller 258, similar to that described in FIG. 2.

At operation 412, the controller 220 determines the speed 250 associated with the motor 204 based at least on the determined inductance values Ld and Lq 236. For example, the controller 220 may determine the speed 250 by implementing the sensor-less algorithm 234, similar to that described in FIG. 2.

At operation 414, the controller 220 determines the angle 252 based at least on the determined inductance values Ld and Lq 236. For example, the controller 220 may determine the angle 252 by implementing the sensor-less algorithm 234, similar to that described in FIG. 2.

At operation 416, the controller 220 determines the flux 254 based at least on the determined inductance values Ld and Lq 236. For example, the controller 220 may determine the flux 254 by implementing the sensor-less algorithm 234, similar to that described in FIG. 2.

At operation 418, the controller 220 determines the torque 256 based at least on the determined inductance values Ld and Lq 236. For example, the controller 220 may determine the torque 256 by implementing the sensor-less algorithm 234, similar to that described in FIG. 2.

At operation 420, the controller 220 controls the operation of the motor 204 based at least on the reference currents Id and Iq 238, speed 250, angle 252, flux 254, and torque 256.

The motor 204 may operate the component 205 according to the reference currents Id and Iq 238, speed 250, angle 252, flux 254, and torque 256.

While several embodiments have been provided in the present disclosure, it should be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated with another system or certain features may be omitted, or not implemented.

In addition, techniques, systems, subsystems, and methods described and illustrated in the various embodiments as discrete or separate may be combined or integrated with other systems, modules, techniques, or methods without departing from the scope of the present disclosure. Other items shown or discussed as coupled or directly coupled or communicating with each other may be indirectly coupled or communicating through some interface, device, or intermediate component whether electrically, mechanically, or otherwise. Other examples of changes, substitutions, and alterations are ascertainable by one skilled in the art and could be made without departing from the spirit and scope disclosed herein.

To aid the Patent Office, and any readers of any patent issued on this application in interpreting the claims appended hereto, applicants note that they do not intend any of the appended claims to invoke 35 U.S.C. § 112 (f) as it exists on the date of filing hereof unless the words "means for" or "step for" are explicitly used in the particular claim.

The invention claimed is:

1. A system for calibrating inductance at a motor, comprising:
   a motor configured to operate a motor-driven component;
   a motor drive circuit configured to power the motor; and
   a processor communicatively coupled to the motor, and configured to:
      determine inductance map data that comprises a plurality of inductance values associated with a plurality of current values, wherein each of the plurality of inductance values is measured when a respective current value from among the plurality of current values applied to the motor;
      determine that the motor is in operation;
      in response to determining that the motor is in operation:
         determine two current values with which the motor is being operated;
         determine two inductance values associated with the determined two current values, wherein determining the two inductance values associated with the determined two current values comprises:
            search for the two current values from among the plurality of current values in the inductance map data; and
            identify, from among the plurality of inductance values, the two inductance values that is associated with the two current values in the inductance map data;
         determine two reference current values based at least in part upon the determined two inductance values;
         determine an angle associated with the motor based at least in part upon the determined two inductance values;
         determine a speed associated with the motor based at least in part upon the determined inductance values;
         determine a flux associated with the motor based at least in part upon the determined two inductance values;
         determine a torque associated with the motor based at least in part upon the determined two inductance values; and
         control an operation of the motor based at least in part upon the determined two reference current values, the determined angle, the determined speed, the determined flux, and the determined torque.

2. The system of claim 1, wherein:
   the inductance map data is determined from two three-dimensional arrays that comprise a first array and a second array;
   each element of the first array corresponds to a respective inductance value in a direct axis (Ld) as a function of a first current value in a direct axis (Id) and a second current value in a quadrature axis (Iq); and
   each element of the second array corresponds to a respective inductance value in a quadrature axis (Lq) as a function of the Id and a Iq.

3. The system of claim 1, wherein determining the inductance map data comprises:
   receive a scan a quick response (QR) code that is encoded with a set of coefficient values associated with two polynomial equations that represent the plurality of inductance values as a function of the plurality of current values;
   access the set of coefficient values in response to receiving the scan of the QR code;
   determine the inductance map data based at least in part upon the set of coefficient values;
   wherein:
      the two polynomial equations comprise a first polynomial equation that outputs a first inductance value in a direct axis (Ld) as a function of a first current value in a direct axis (Id) and a second current value in a quadrature axis (Iq); and
      the two polynomial equations further comprise a second polynomial equation that outputs a second inductance value in a quadrature axis (Lq) as a function of Id and Iq.

4. The system of claim 1, wherein determining the inductance map data comprises:
   receive a scan a quick response (QR) code that is encoded with a token identifier (ID), wherein the token ID is associated with the motor and the inductance map data;
   determine that the token ID is verified; and
   receive the inductance map data in response to determining that the token ID is verified.

5. The system of claim 1, wherein the determined two inductance values comprise a first inductance value along a direct axis (Ld) and a second inductance value along a quadrature axis (Lq).

6. The system of claim 1, wherein the determined two current values comprise a first current value along a direct axis (Id) and a second current value along a quadrature axis (Iq).

7. The system of claim 1 wherein:
   the reference current is a stable current that does not fluctuate over any of temperature variations, supply voltage variations, or load variations with respect to the motor;

the speed is a speed at which the motor rotates; and
the torque is generated in the motor due to an interaction between a magnetic field of a stator and a rotor associated with the motor.

8. A method for calibrating inductance at a motor, comprising:
determining inductance map data that comprises a plurality of inductance values associated with a plurality of current values, wherein each of the plurality of inductance values is measured when a respective current value from among the plurality of current values applied to the motor;
determining that the motor is in operation;
in response to determining that the motor is in operation:
determining two current values with which the motor is being operated;
determining two inductance values associated with the determined two current values, wherein determining the two inductance values associated with the determined two current values comprises:
search for the two current values from among the plurality of current values in the inductance map data; and
identifying, from among the plurality of inductance values, the two inductance values that is associated with the two current values in the inductance map data;
determining two reference current values based at least in part upon the determined two inductance values;
determining an angle associated with the motor based at least in part upon the determined two inductance values;
determining a speed associated with the motor based at least in part upon the determined two inductance values;
determining a flux associated with the motor based at least in part upon the determined two inductance values;
determining a torque associated with the motor based at least in part upon the determined two inductance values; and
controlling an operation of the motor based at least in part upon the determined two reference current values, the determined angle, the determined speed, the determined flux, and the determined torque.

9. The method of claim 8, wherein:
the inductance map data is determined from two three-dimensional arrays that comprise a first array and a second array;
each element of the first array corresponds to a respective inductance value in a direct axis (Ld) as a function of a first current value in a direct axis (Id) and a second current value in a quadrature axis (Iq); and
each element of the second array corresponds to a respective inductance value in a quadrature axis (Lq) as a function of the Id and a Iq.

10. The method of claim 8, wherein determining the inductance map data comprises:
receiving a scan a quick response (QR) code that is encoded with a set of coefficient values associated with two polynomial equations that represent the plurality of inductance values as a function of the plurality of current values;
accessing the set of coefficient values in response to receiving the scan of the QR code;
determining the inductance map data based at least in part upon the set of coefficient values;

wherein:
the two polynomial equations comprise a first polynomial equation that outputs a first inductance value in a direct axis (Ld) as a function of a first current value in a direct axis (Id) and a second current value in a quadrature axis (Iq); and
the two polynomial equations further comprise a second polynomial equation that outputs a second inductance value in a quadrature axis (Lq) as a function of Id and Iq.

11. The method of claim 8, wherein determining the inductance map data comprises:
receiving a scan a quick response (QR) code that is encoded with a token identifier (ID), wherein the token ID is associated with the motor and the inductance map data;
determining that the token ID is verified; and
receiving the inductance map data in response to determining that the token ID is verified.

12. The method of claim 8, wherein the determined two inductance values comprises a first inductance value along a direct axis (Ld) and a second inductance value along a quadrature axis (Lq).

13. The method of claim 8, wherein the determined two current values comprises a first current value along a direct axis (Id) and a second current value along a quadrature axis (Iq).

14. The method of claim 8, wherein:
the reference current is a stable current that does not fluctuate over any of temperature variations, supply voltage variations, or load variations with respect to the motor;
the speed is a speed at which the motor rotates; and
the torque is generated in the motor due to an interaction between a magnetic field of a stator and a rotor associated with the motor.

15. A non-transitory computer-readable medium storing instructions that when executed by a processor, cause the processor to:
determine inductance map data that comprises a plurality of inductance values associated with a plurality of current values, wherein each of the plurality of inductance values is measured when a respective current value from among the plurality of current values applied to a motor;
determine that the motor is in operation;
in response to determining that the motor is in operation:
determine two current values with which the motor is being operated;
determine two inductance values associated with the determined current value, wherein determining the two inductance values associated with the determined two current values comprises:
search for the two current values from among the plurality of current values in the inductance map data; and
identify, from among the plurality of inductance values, the two inductance values that is associated with the two current values in the inductance map data;
determine two reference current values based at least in part upon the determined two inductance values;
determine an angle associated with the motor based at least in part upon the determined two inductance values;

determine a speed associated with the motor based at least in part upon the determined two inductance values;

determine a flux associated with the motor based at least in part upon the determined two inductance values;

determine a torque associated with the motor based at least in part upon the determined two inductance values; and control an operation of the motor based at least in part upon the determined two reference current values, the determined angle, the determined speed, the determined flux, and the determined torque.

16. The non-transitory computer-readable medium of claim 15, wherein:

the inductance map data is determined from two three-dimensional arrays that comprise a first array and a second array;

each element of the first array corresponds to a respective inductance value in a direct axis (Ld) as a function of a first current value in a direct axis (Id) and a second current value in a quadrature axis (Iq); and each element of the second array corresponds to a respective inductance value in a quadrature axis (Lq) as a function of the Id and a Iq.

17. The non-transitory computer-readable medium of claim 15, wherein determining the inductance map data comprises:

receive a scan a quick response (QR) code that is encoded with a set of coefficient values associated with two polynomial equations that represent the plurality of inductance values as a function of the plurality of current values;

access the set of coefficient values in response to receiving the scan of the QR code;

determine the inductance map data based at least in part upon the set of coefficient values;

wherein:

the two polynomial equations comprise a first polynomial equation that outputs a first inductance value in a direct axis (Ld) as a function of a first current value in a direct axis (Id) and a second current value in a quadrature axis (Iq); and the two polynomial equations further comprise a second polynomial equation that outputs a second inductance value in a quadrature axis (Lq) as a function of Id and Iq.

18. The non-transitory computer-readable medium of claim 15, wherein determining the inductance map data comprises:

receive a scan a quick response (QR) code that is encoded with a token identifier (ID), wherein the token ID is associated with the motor and the inductance map data;

determine that the token ID is verified; and receive the inductance map data in response to determining that the token ID is verified.

19. The non-transitory computer-readable medium of claim 15, wherein the determined two inductance values comprises a first inductance value along a direct axis (Ld) and a second inductance value along a quadrature axis (Lq).

20. The non-transitory computer-readable medium of claim 15, wherein the determined two current values comprises a first current value along a direct axis (Id) and a second current value along a quadrature axis (Iq).

* * * * *